Patented Mar. 19, 1935

1,995,037

UNITED STATES PATENT OFFICE 1,995,037

SUBSTANCE FOR TREATMENT OF HEMORRHAGIC DIATHESIS

Samuel M. Peck, New York, N. Y.

No Drawing. Application August 6, 1932,
Serial No. 627,809

2 Claims. (Cl. 167—74)

The present invention relates to substances for treatment of hemorrhagic diathesis and embodies, more specifically, a compound including snake venom for preventing hemorrhages. Unsuccessful attempts to produce a Schwartzman phenomenon (local hemorrhagic necrosis following local and intravenous injections of bacterial toxic filtrates with fungus extracts) induced the present inventor to hope that previous local injections of a vascular poison might render the reaction site more sensitive to hypothetical toxic substances in fungus cultures. Accordingly, snake venom was employed without success. Where snake venom was so employed, it was found that, after the lapse of fourteen days to one month, between the time of injection of rabbits with snake venom and the elicitation of a Schwartzman phenomenon, a large number of the animals became refractory to a Schwartzman phenomenon. No circulating antibodies could be demonstrated to explain the refractory state and since antivenin had no effect on the course of the Schwartzman phenomenon, the induced refractory state is thought to be due to some change in the vessel walls which makes them resistant to toxic filtrates and thus prevents hemorrhage. With this in mind, the present inventor then treated, with snake venom, diseases which can be grouped under hemorrhagic diathesis. Very astonishing and marked results obtained indicate that the snake venom produces a definite condition or reaction which prevents, or retards hemorrhage.

In carrying out the invention, the venom of the cotton mouth moccasin has been found to be particularly effective and has been found to be suitable in as much as it has a tendency, when injected in sufficient concentration, to produce a local hemorrhage. The venom of the copperhead is also quite suitable while that of the rattle snake and bothrops is unsuitable. In this connection it is believed that the substance used raises the resistance of blood vessels to hemorrhage by an effect directly upon the blood vessels or by the production of circulating bodies (antihemorrhagii), or a combination of the two effects.

In administering the substance, a satisfactory dose for an adult is 0.4 cc. of a 1:3000 solution in physiological saline given intradermally or subcutaneously. The injections may be given once or twice weekly, the duration of treatment varying with the cases.

A considerable number of patients have been treated, the patients falling into a number of classes or groups. In one group wherein particularly good results have been observed, is a case of epistaxis (idiopathic) which was present for more than a year in a seven year old boy and five cases of functional uterine bleeding also of long duration were treated. Very soon after treatment was begun these cases showed a definite improvement in the form of a reduction in duration and amount of bleeding.

It will thus be seen that the present invention embodies a compound for treating hemorrhagic diathesis, such compound necessarily including a toxin that produces a refractory state to the Schwartzman phenomenon in rabbits. The particular venom used may be varied in accordance with the properties of the venom. To this extent, the present invention is sufficiently broad to cover compounds composed of ingredients of such natures and is not to be limited, save as defined in the appended claims.

I claim as my invention:—

1. A compound for treatment of hemorrhagic diathesis including a solution of the venom of the cotton mouth mocassin.

2. A compound for treatment of hemorrhagic diathesis including venom of the cotton mouth moccasin in a physiological saline solution in the ratio of 1 to 3000.

SAMUEL M. PECK.